United States Patent [19]
Chiang et al.

[11] Patent Number: 5,921,363
[45] Date of Patent: Jul. 13, 1999

[54] FREE WHEEL ROTARY BODY STRUCTURE OF A BICYCLE

[75] Inventors: Chung-Ping Chiang, Taipei; Pai-Hsiang Hsu, Tainan; Chang-Dau Yan, Taipei; Yuh-Ming Hwang, Kaohsiung, all of Taiwan

[73] Assignee: Industrial Technology Research Institute, Hsinchu, Taiwan

[21] Appl. No.: 08/752,084

[22] Filed: Nov. 19, 1996

[30] Foreign Application Priority Data

Jun. 7, 1996 [TW] Taiwan .................................. 85208527

[51] Int. Cl.$^6$ ..................................................... F16D 41/30
[52] U.S. Cl. ................................................. 192/64; 192/46
[58] Field of Search ........................... 192/64, 46, 48.92, 192/71, 107 T, 108; 301/105.1, 110.5; 188/82.77

[56] References Cited

U.S. PATENT DOCUMENTS

| | | | |
|---|---|---|---|
| 1,429,196 | 9/1922 | Dughera | 192/64 |
| 4,254,852 | 3/1981 | Orozco | 192/46 |
| 4,363,390 | 12/1982 | Eisend et al. | 192/46 |
| 5,518,096 | 5/1996 | Lin | 192/64 |
| 5,642,796 | 7/1997 | Tabe | 192/64 |

Primary Examiner—Richard M. Lorence
Attorney, Agent, or Firm—W. Wayne Liauh

[57] ABSTRACT

A free wheel rotary body structure for use in a bicycle is disclosed. It includes a free wheel kernel having a pair of axially extending ratchet pawl bearings at diametrically opposite positions relative to each other and a pair of ring grooves. The rotary body structure also includes first and second sets of one-way clutches. Each of the one-way clutches includes a c-spring and a pair of ratchet pawls. The pair of c-springs are received in the pair of ring grooves, respectively, of the free wheel kernel, and the pairs of ratchet pawls are received in the diametrically opposing pawl bearings, respectively, of the free wheel kernel. The pair of ratchet pawls in the first set of one-way clutch are of different shapes and dimensions from the pair of ratchet pawls in the second set of one-way clutch, so as to form phase difference when one of each pair of the ratchet pawls is engaged with the ratchet teeth groove of the free wheel housing.

6 Claims, 9 Drawing Sheets

FREE WHEEL ROTARY BODY STRUCTURE OF A BICYCLE

FIELD OF INVENTION

The present invention is the free wheel Rotary Body structure of a bicycle, especially, the one that can effectively reduce the interval of back-pedal idling of a rider during the rotation and counter-rotation of the free wheel Rotary Body, thereby, to lower the impact between the ratchet teeth groove and the pawl so as to raise the reliability and service life of the overall structure, and also to smoothen the dynamic transmission output so as to increase the comfort ability, what is more, it can maintain the assembly strength of the freewheel kernel and the one-way clutch when a free wheel with small diameter is needed.

BACKGROUND OF THE INVENTION

Figure 1:
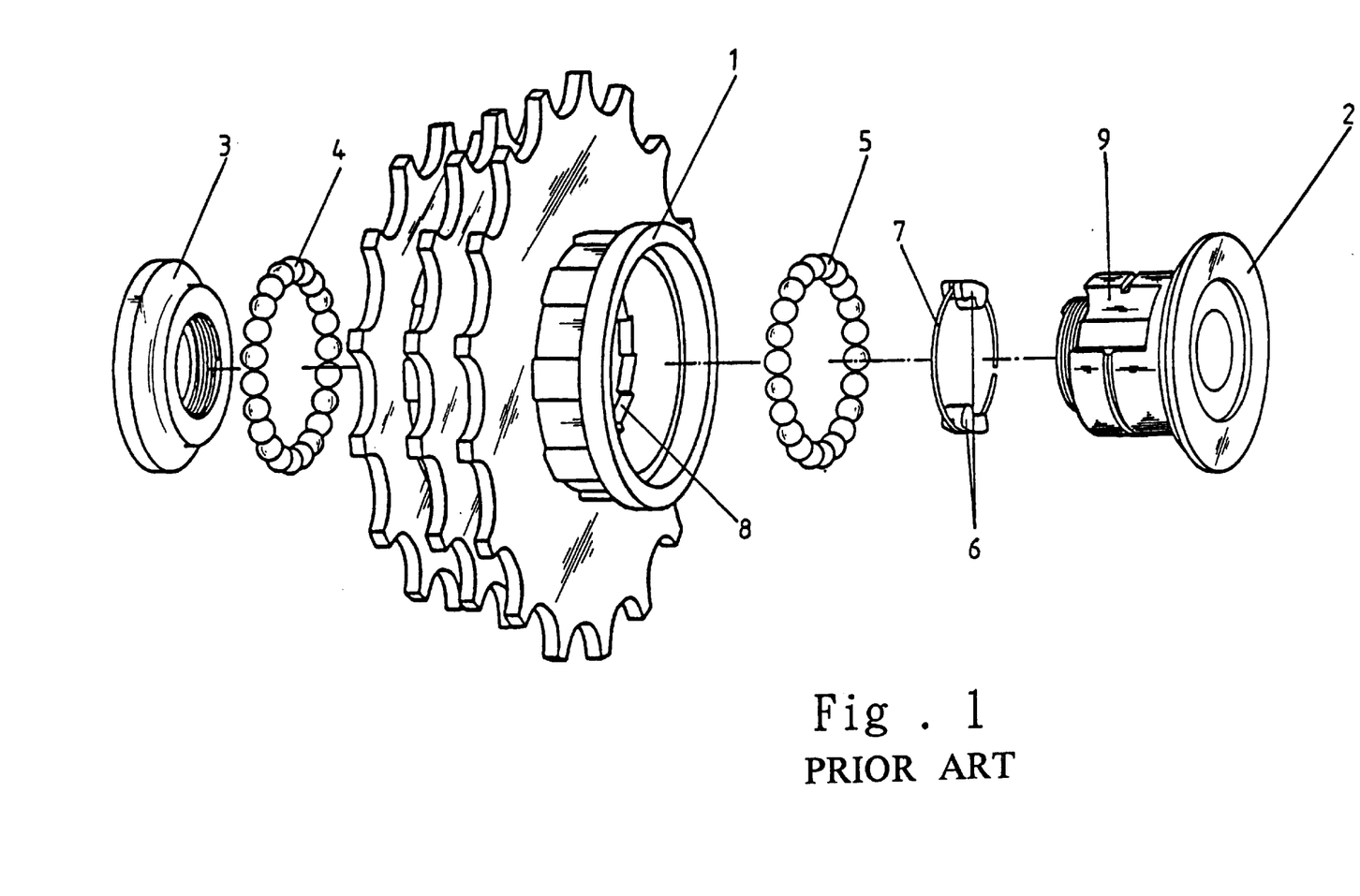
FIG. 1 is the explored view of the components of the single set one-way clutch of the prior art.
Figure 2:
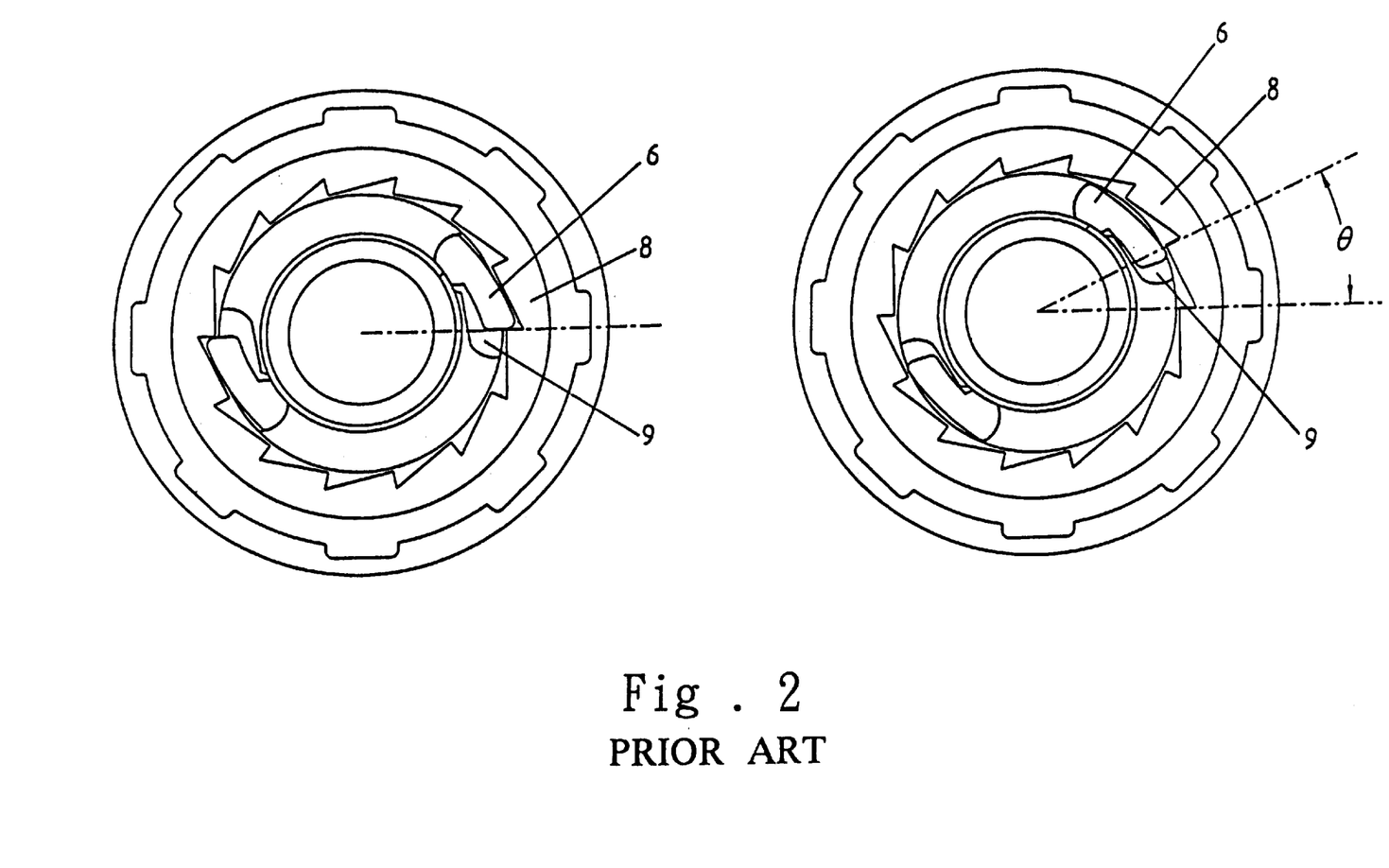
FIG. 2 is the schematic diagram showing the maximum angleinterval between the brake-driving and non-brake-driving single set one-way clutch of the prior art.

Normally, the transmission mode of a bicycle is to transmit through the sprocket of the front pedal, by means of the chain, to the sprocket assembly at the rear axle so that the rider can tread upon the pedal to drive the bicycle forward, but in order not to affect the forward action during the stopping and counter-rotation of the pedal, a free wheel Rotary Body is installed at the rear axle where the most important part of the said Rotary Body is to have a clutch with an one-way brake which possesses brake-driving effect to drive the wheel when the rider is pedaling and it will not affect the wheel rotation when the rider is not pedaling or in back-pedaling. The free wheel Rotary Body structure of a bicycle of the currently known prior art, based on this kind of transmission mode, has the following two types which will be depicted, with their advantages and disadvantages, as follows:

1. Referring to FIG. 1, the main components of the first type comprise: a free wheel housing 1, a free wheel kernel 2, a steel ball top cover 3, two sets of steel balls placed in annular shape 4 and 5 and the one-way clutch installed in the free wheel kernel 2; the one-way clutch is consisted of a pair of ratchet pawls 6, a c-spring and a ratchet teeth groove 8 with the free wheel ratchet pawl 6 fitted on the float on the ratchet pawl bearing 9 of the kernel by means of the c-spring and to make the ratchet pawl 6 have a rotational clearance with a small angle in the bearing 9; the ratchet pawl 6 can catch the ratchet teeth groove 8, which is in the inner side of the free wheel housing, to have brake-driving effect whenever there is a rotation in certain direction between the free wheel housing and the kernel; while the ratchet teeth groove 8 can press the free wheel ratchet pawl to recess into the bearing 9 of the free wheel kernel to rotate, thereby, it allows rotation in only one direction. Referring to FIG. 2, when the rider performs pedaling, back pedaling and re-pedaling, i.e., the one-way clutch of the free wheel kernel goes through the process of brake-driving, recessing to rotate and re-brake-driving, the largest possible idle pedaling interval is an angle (theta) of a ratchet tooth, in case the theta angle is too large, it is apt to cause power output delay, also, the relative velocity between the ratchet teeth and the ratchet pawl will be excessively large which will result in excessive impact forces that not only lowers the service life of the overall structure but also affects the riding comfort ability and safety; the improvement, under this condition, tends to reduce the interval (the angle theta of ratchet teeth) of idle pedaling, one way of attaining this is to try to increase the ratchet teeth number in order to decrease the ratchet teeth angle but considering the fact that the provision of sufficient brake-driving force between the ratchet teeth and ratchet pawl needs sufficient teeth depth and also the increase of teeth number will result in the decrease of teeth depth under the original diameter, therefore, one can not simply increase the teeth number while neglect the derivative negative-effect in order to improve the above mentioned situation.

Figure 3:
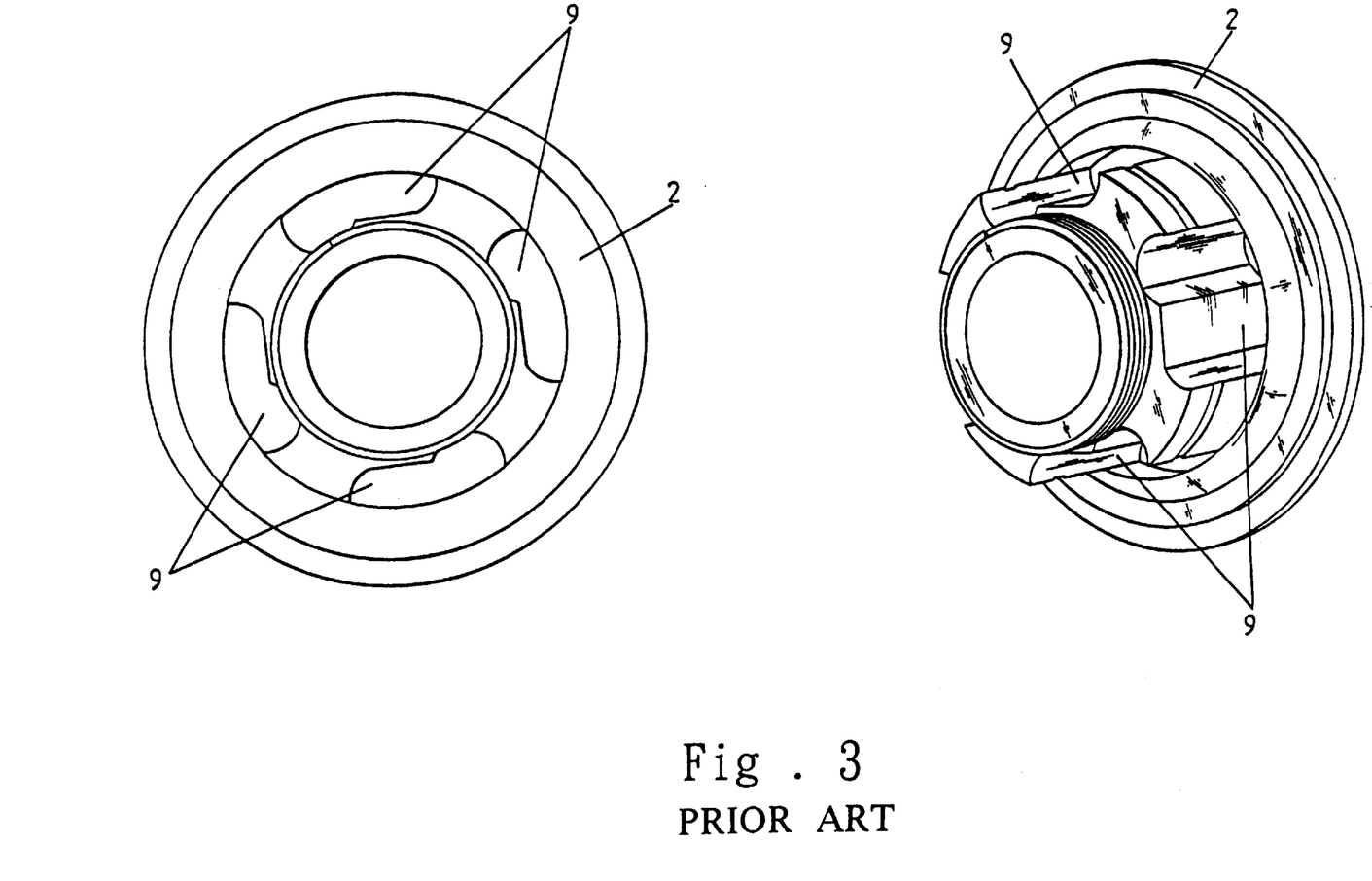
FIG. 3 is the schematic diagram of the free wheel kernel with double set one-way clutch of the prior art.

2. Referring to FIG. 3, in addition to the components included in the first type, the second type comprises an extra set of one-way clutch and the two sets of one-way clutches are installed on the same plane in the kernel with an interval of a phase difference, that is, it needs to establish, in the same kernel, two sets of ratchet pawl bearings 9 corresponding to each other, under this premise, it will not only increase the manufacturing cost but also affect the strength of kernel 2, and the influence will become even prominent, especially when the free wheel needs a small diameter. In addition, one must consider the fact that current trend of bicycle development is to increase the range of speed variation which lies in the lowering of the teeth number of the sprocket assembly which are meshed around the free wheel housing, that is, when the teeth number is reduced, the forwarding velocity of the bicycle will increase, but the reduction of the teeth number will cause the diminishing of the sprocket assembly accordingly; in order to assure the sufficient strength of the small sprocket assembly, it is better to keep the internal hole, where sprocket assembly meshed with the spline on the free wheel housing, as small as possible, hence, free wheel with small diameter is the target to endeavor nowadays; under this tendency, the diminished diameter of the housing will result in the reduction of the number of the internal ratchet teeth, thereby, will cause the increase of the interval of the idle pedaling (theta increase) accordingly as the first type of structure mentioned above, which only get into the situation of "taking care of one and losing hold of the other", and the second type of structure as aforesaid will seriously affect the strength of the kernel, therefore, on the development of free wheel with small diameter, there are bottlenecks which are hard to break through in both the first type and second type of structure. In view of this, the inventors, accumulated their long time experience and through their persistent research on the design, finally developed a Rotary Body structure of the free wheel which not only can raise the reliability of the overall structure and service life but also can be applied in free wheel with small diameter without affecting the strength of the structural assembly of the kernel and the one-way clutch, thereby, greatly improve the shortcomings of the prior art, and by means of that, to accommodate the trend of future development to attain the object of expanding the range of speed variation, and this is the aim of design of the present invention.

SUMMARY OF THE INVENTION

The main object of the present invention is to provide a free wheel Rotary Body structure of a bicycle which mainly utilize the mutual brake-driving of two sets of one-way clutch which uses ratchet pawls with different shapes and dimensions installed in the ratchet pawl bearing within the same kernel in an up-and-down arrangement that manage to form a phase difference when it contacts to mesh with the ratchet teeth groove, thereby, one set of one-way clutch brakes to drive the ratchet teeth groove to rotate when the free wheel Rotary Body performs rotating operation while the other set of one-way clutch is pressed by the ratchet teeth groove to recess in the ratchet pawl bearing of the kernel without brake-driving effect; as the free wheel performs counter-rotation for half of an interval angle, the one-way clutch brake to drive to rotate previously is then pressed to recess without brake-driving effect and this brake-driving effect is provided by the other one-way clutch which ends up with reduction on impact force between the ratchet teeth groove and the ratchet pawl during the course of rotation, counter-rotation and re-rotation; it can also reduce the interval of rider's back-and-forth idle pedaling that makes the power transmission and output more smoothly, thereby, raises the comfort ability.

The other object of the present invention is to provide a free wheel Rotary Body structure which utilizes a single ratchet pawl bearing without increasing the cost of manufacturing under the condition of effectively reducing the interval of idle pedaling; the more important thing is that the present invention can greatly reduce the interval of idle pedaling under the condition that it is necessary to reduce the number of ratchet teeth when it comes to requiring free wheel with small diameter, furthermore, the present invention can not only provide the compensation action on the improvement but also maintain the strength of the assembly of the free wheel kernel and the one-way clutch, therefore, the present invention can be applied in the free wheel with small diameter and it can also increase the range of speed variation.

For these reasons and in order to make your honor examiners further understand the structure and principle of the present invention, the authors herewith present a better embodiment with detailed illustration together with the accompanied drawings shown as follows:

DETAILED DESCRIPTION OF THE INVENTION

Figure 4:
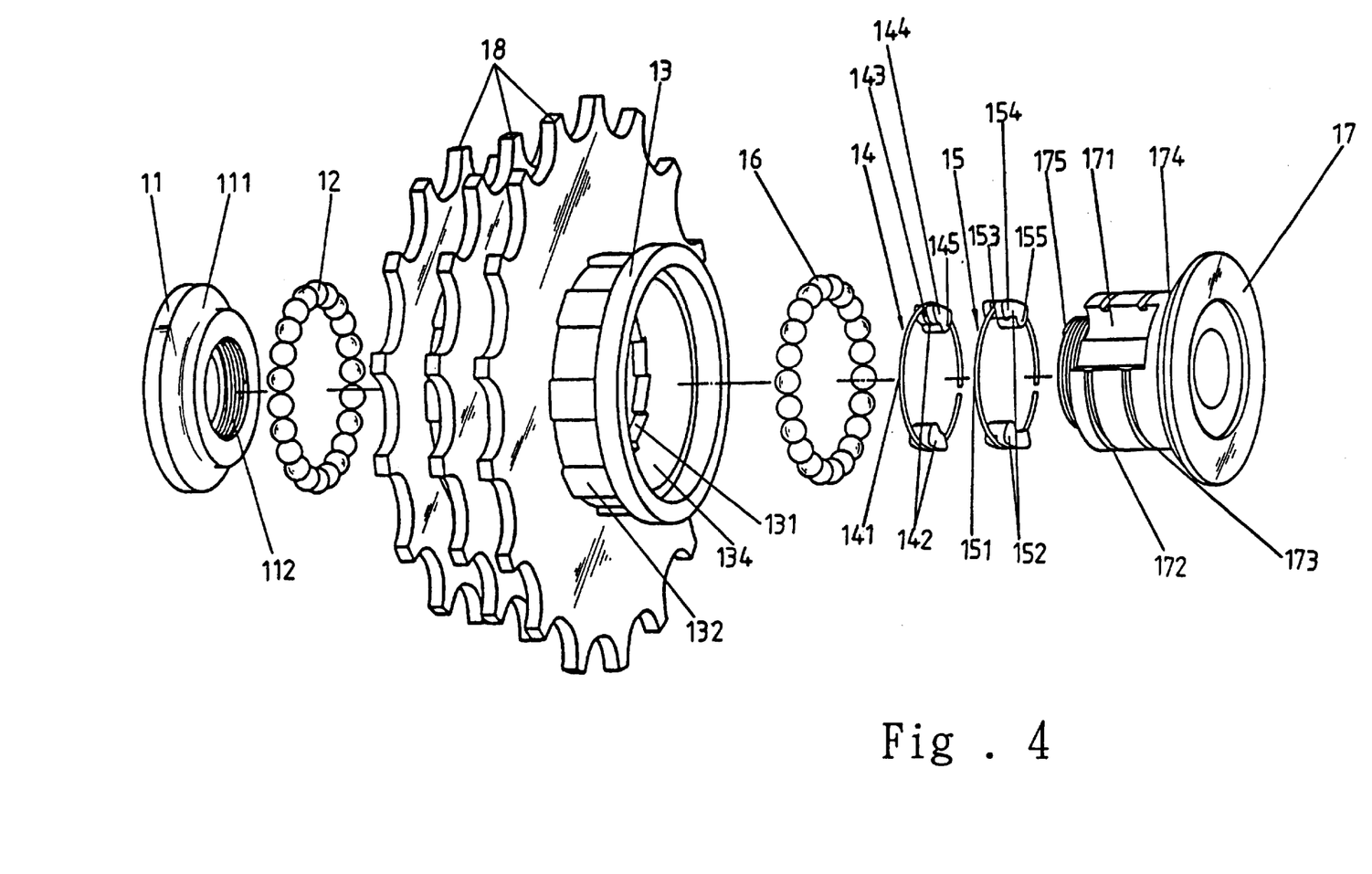
FIG. 4 is the explored view of the components of the free wheel Rotary Body of the present invention.
Figure 5:
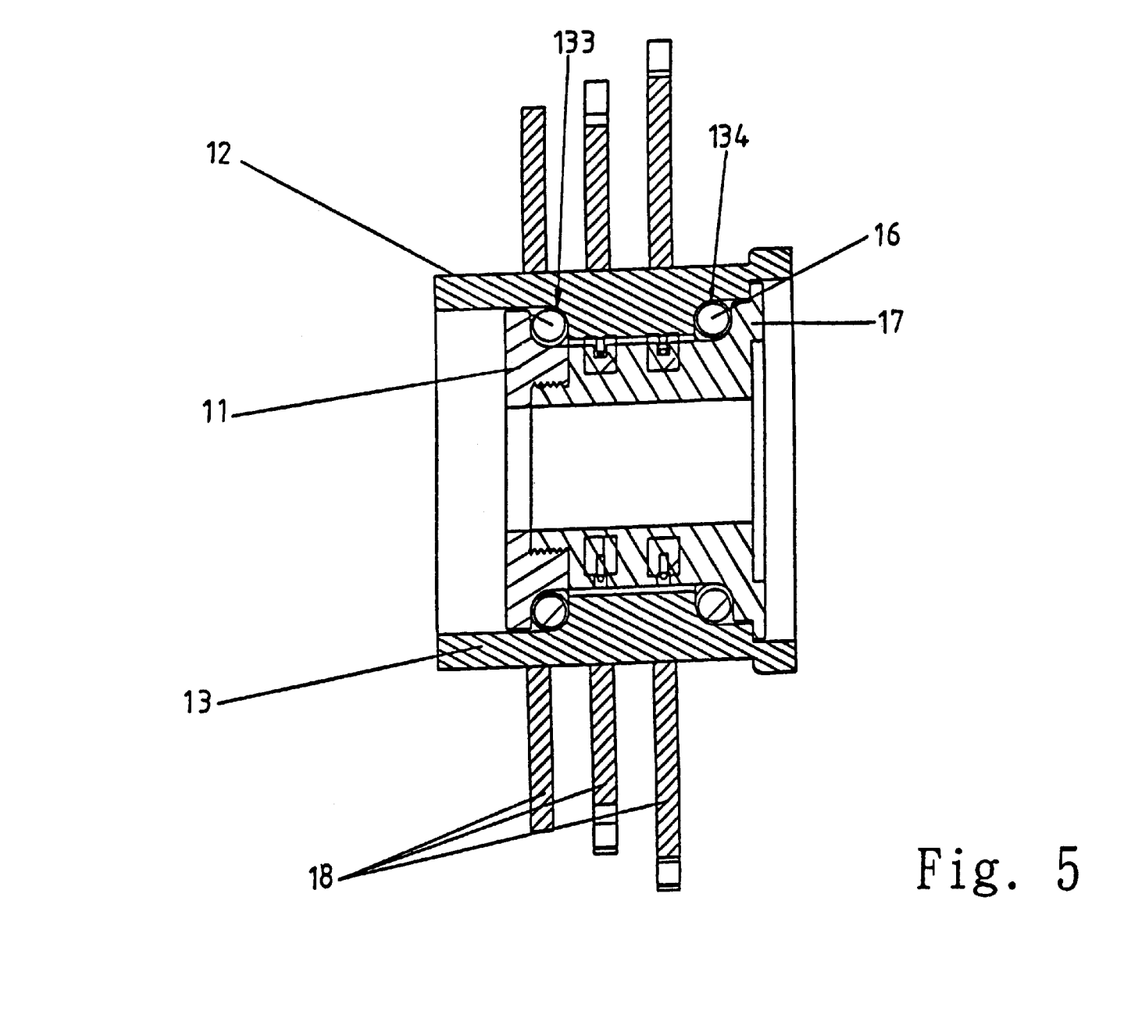
FIG. 5 is the schematic section view of the present invention.
Figure 6:
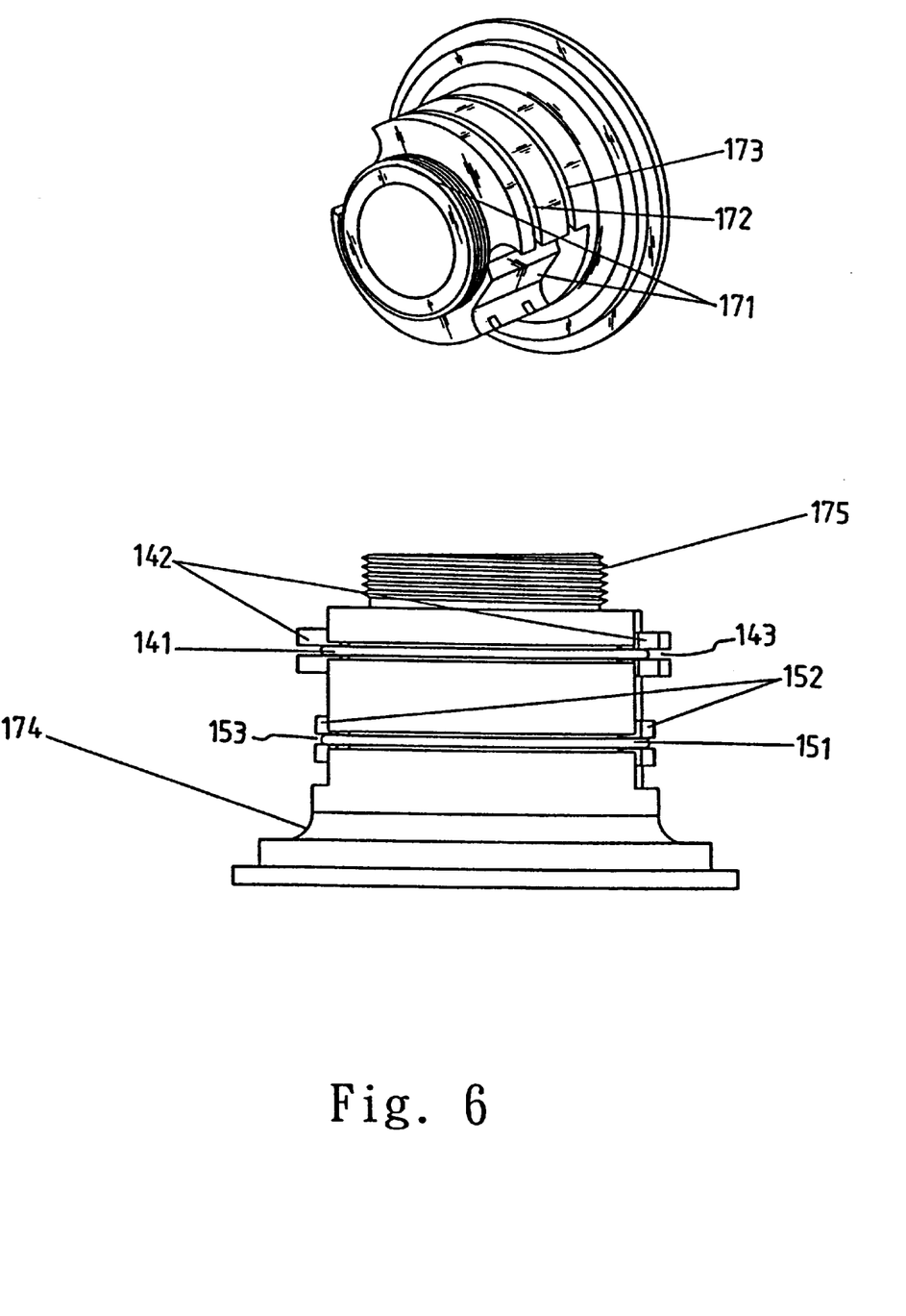
FIG. 6 is the schematic view of the partial assembly structure of the free wheel kernel of the present invention.
Figure 7:
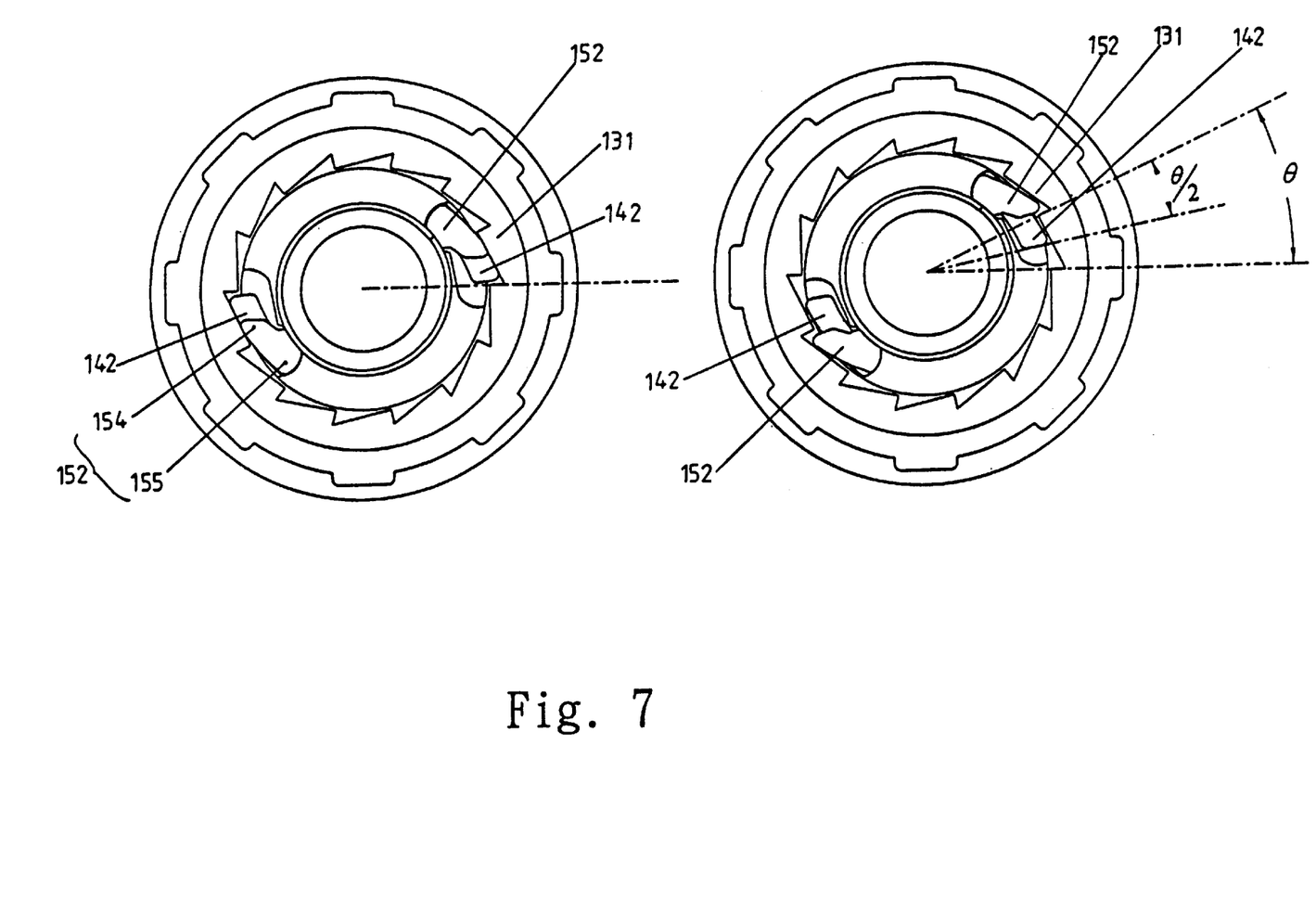
FIG. 7 is the schematic view showing the interactive relationship of the two sets of one-way clutch of the present invention.
Figure 8:
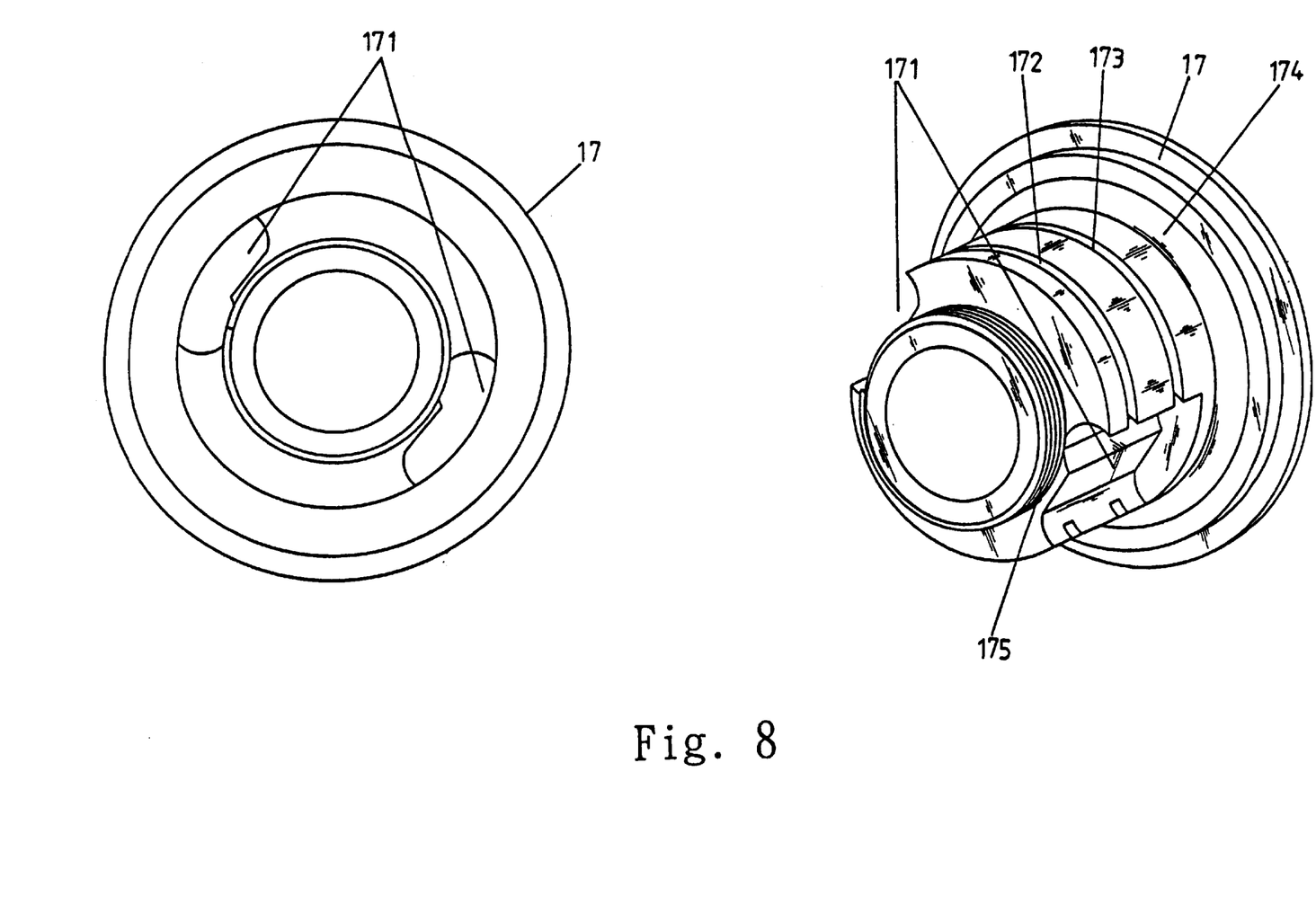
FIG. 8 is the schematic view of the kernel of the present invention.
Figure 9:
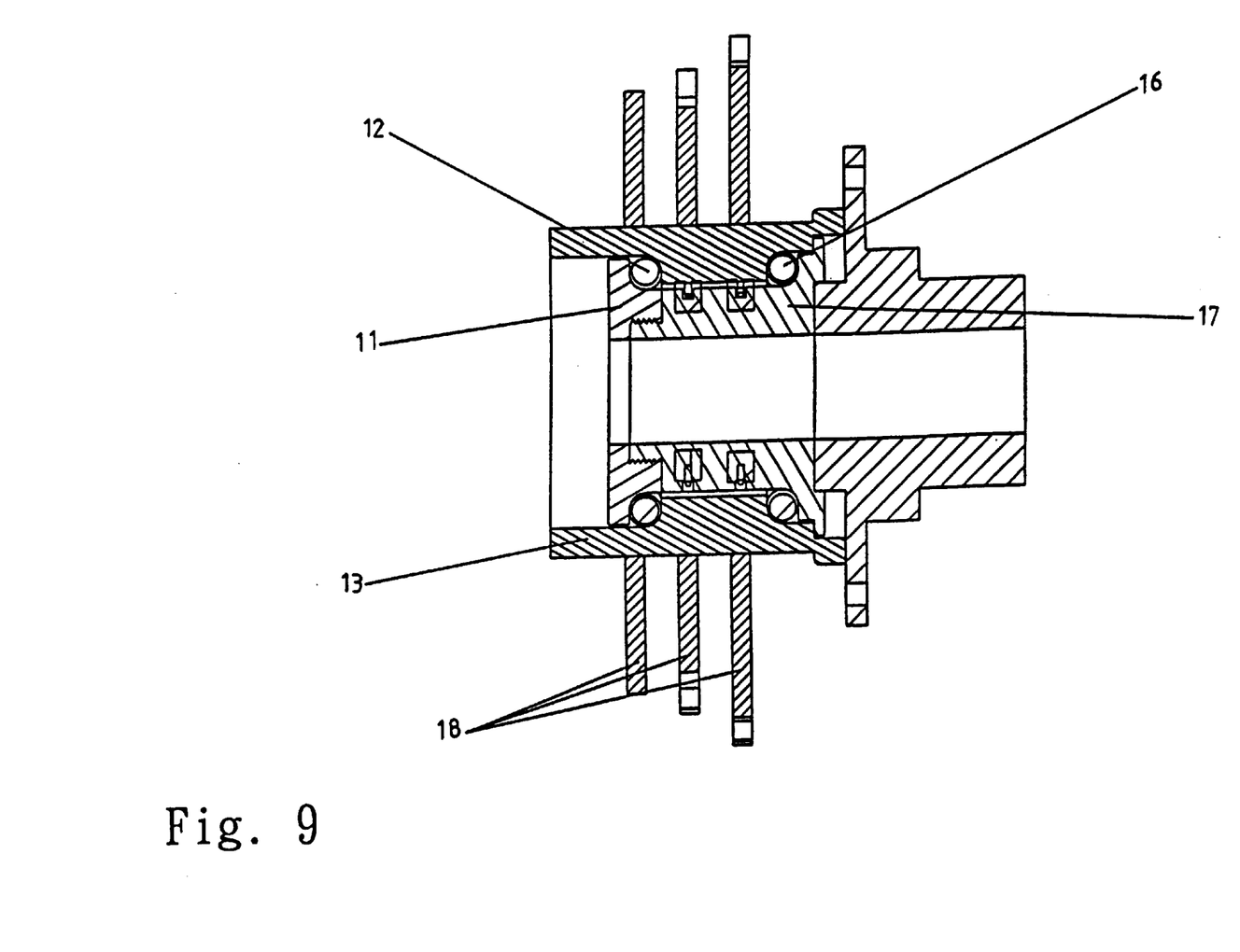
FIG. 9 is the schematic view of the present invention applied in cassette free wheel group.

Referring to FIG. 4 and 5, the main components of the present invention comprises a steel ball top cover 11, the first row of steel ball ring 12, a free wheel housing 13, the first set of one-way clutch 14, the second set of one-way clutch 15, the second row of steel ball ring 16 and a free wheel kernel 17 where there is a top cover steel ball track 111 on the steel ball top cover 11 matching with the first housing steel ball track 133 to contain the first row steel ball ring 12 and there is also a steel ball track 174 on the kernel 17 matching with the steel ball track of the second housing 134 to contain the second steel ball ring 16, also the steel ball top cover 11 and the free wheel kernel 17 are placed in the free wheel housing 13 and are locked to fix one another by means of the cover's internal thread 112 and the kernel's exterior thread 175, thereby, relying upon the insertion of two rows of steel ball rings among the housing 13, top cover 11 and kernel 17, it enable the housing 13 and kernel 17 to perform free rotation, in addition, the free wheel housing 13, with its ratchet teeth groove 131 established at an appropriate inner location, is braked to drive the one-way clutch 14 and 15, and with its external spline 132 which is set up at the exterior ring surface, is meshed with the sprocket assembly 18. Referring to FIG. 4, 5, 6, the first c-spring 141 of the first set of one-way clutch 14 is installed at the first c-spring settled groove 172 at the free wheel kernel 17, and since every ratchet pawl pair has groove 143, 153 to provide the c-spring 141, 151 to clip, hence, the first c-spring 141 can make the first ratchet pawl pair 142 slip on the ratchet pawl bearing 171; similarly, the second c-spring 151 of the second set of one-way clutch 15 is installed at the second c-spring settled groove 173 at the free wheel kernel 17 to make the second ratchet pawl pair 152 slip on the same ratchet pawl bearing 171, that is, the first and second set of one-way clutch 14 and 15 are installed at the ratchet pawl bearing 171 in the same kernel in an up-and-down arrangement where each of the ratchet pawl pair 142 and 152 consists of two pieces of ratchet pawl in the same dimension but the dimension of ratchet pawl pair 142 is smaller than that of the ratchet pawl pair's 152; since each ratchet pawl pair possesses pawl ends 144, 145 with different minor radius of curvature and rotational seat ends 145, 155 with different major radius of curvature, the ratchet pawl bearing 171 possesses pockets with different shape to ontain the major and minor ends of the ratchet pawl pair and to accommodate the major and minor radii of curvature of the ratchet pawl pairs to slip on, and by use of the minor radius pawl ends 144 and 154, each of the ratchet pawl brakes or presses with the ratchet teeth groove 131; during counter-rotating the ratchet pawl pairs 142 and 152 rotate a small angle along the ends of the major radius rotating seats that make the ratchet pawl pairs 142 and 152 recess into the ratchet pawl bearing 171 and have their outside diameters almost equal those of the kernel 17, thereby, idle together with the kernel 17, also the two pairs of ratchet pawl 142 and 152 possess different shapes with different major and minor radii, therefore form angle difference when match to contact with ratchet teeth groove 131 when the free wheel Rotary Body performs rotating operation this is a set of one-way clutch brakes to drive the ratchet teeth groove 131 to rotate while the other set of one-way clutch is pressed to recess, by the ratchet teeth groove 131, into the ratchet pawl bearing 171 of the kernel 17 without any brake-driving effect and as it performs counter-rotation with an angle interval of half a tooth groove, the previous set of one-way clutch performing brake-driving, at this moment, is pressed to recess without any brake-driving effect, instead, the said brake-driving is provided by another set of one-way clutch. Referring to FIG. 7, the brake-driving effect is provided by use of ratchet pawl pair 142 to brake driving on the ratchet teeth groove 131 shown in FIG. 7-1 while the brake driving effect is provided instead, by use of ratchet pawl pair 152 to brake driving on ratchet teeth groove 131 as it performs counter-rotation with an angle interval of half a tooth groove as shown in FIG. 7–2, therefore, the maximum angle interval between having brake -driving and without brake-driving is diminished to become half of tooth groove interval (theta/2) which can reduce the interval of idle pedaling of the forward-pedaling, back-pedaling, and re-pedaling process which makes the output of power transmission even more smooth, thereby, it can raise the pedaling comfort ability of the rider, lower the relative velocity of the contact between the ratchet teeth groove 131 and the two sets of ratchet pawl pair 142 and 152, lower the impact force of contact as well as raising the reliability and service life of the overall structure. Referring to FIG. 8, the free wheel kernel 17 establishes only one set of ratchet pawl bearing 171, hence, it will not increase the manufacturing cost nor will it affect the strength of the assembly of the kernel and the one-way clutches 14 and 15, it is more appropriate to apply in free wheel with small diameter. Referring to FIG. 9, by making use of the present invention similarly, it can also be applied in a cassette free wheel group which possesses multiple advantages of improvement. To summarize the above-mentioned statement, the present invention can greatly improve the shortcomings of the prior art and is a very practical and progressive design that can provides the industries with value of utilization, also it is not found in any products and publications, thereby, is in compliance with the patentability of application for the present invention.

Although the present invention has been illustrated and described previously with reference to the preferred embodiments thereof, it should be appreciated that it is in no way limited to the details of such embodiments, but is capable of numerous modification within the scope of the appended claims.

What is claimed is:

1. A free wheel rotary body structure for use in a bicycle comprising:

a free wheel housing having an exterior ring surface with an exterior spline to mesh with a sprocket assembly, said free wheel housing also having an interior surface with a ratchet teeth groove and first and second steel ball tracks on first and second sides respectively of said ratch teeth groove;

a steel ball top cover having a steel ball track matching with said first steel ball track of said free wheel housing to contain a first steel ball rings;

a free wheel kernel having a pair of axially extending ratchet pawl bearings at diametrically opposed positions relative to each other and first and second ring grooves, said free wheel kernel further having a steel ball tract and a flange for, in cooperation of said second ball track of said free wheel housing, containing a second steel ball ring;

first and second steel ball rings contained in spaces formed between said free wheel housing and said steel ball top cover, and between said free wheel housing and said free wheel kernel respectively;

first and second sets of one-way clutches each comprising a c-spring and a pair of ratchet pawls said pair of c-springs being received in said first and second ring grooves, respectively of said free wheel kernel, and said pairs of ratchet pawls being received in said diametrically opposing pawl bearings, respectively of said free wheel kernel;

matching female and male threads provided on said steel ball top cover and said free wheel kernel respectively for tightening said steel ball top cover with said free wheel kernel;

further wherein said pair of ratchet pawls contained in said first set of one-way clutch are of different shapes and dimensions from said pair of ratchet pawls contained in said second set of one-way clutch, so as to form phase difference when one of each pair of said ratchet pawls is engaged with said ratchet teeth groove of said free wheel housing.

2. A free wheel rotary body structure for use in a bicycle as claimed in claim 1 wherein one set of said one-way clutch engages to drive said ratchet teeth groove when said free wheel rotary body performs rotational operation while the other set of one-way clutch is temporarily pressed and recessed into the ratchet pawl bearing without any engagement-driving effect, but when it performs counter-rotation with approximately half an interval angle of ratchet teeth groove, the set of one-way clutch previously performing the engagement-driving is pressed to recess to disengage any engagement-driving effect, and, at the same time the other set of one-way clutch is engaged in the engagement-driving action.

3. A free wheel Rotary Body structure of a bicycle as claimed in claim 1 where there are two settled grooves established on the surface of the said free wheel kernel for c-spring with ratchet pawl pairs to press to clip around.

4. A free wheel Rotary Body structure of a bicycle as claimed in claim 1 where there are grooves established on the ratchet pawl pairs for c-spring to fit in.

5. A free wheel Rotary Body structure of a bicycle as claimed in claim 1 where there are pawl end with minor radius and rotating set end with major radius to slip on the ratchet pawl bearing.

6. A free wheel rotary body structure for use in a bicycle as claimed in claim 1 wherein said ratchet pawl bearing of the free wheel kernel possesses pockets with different shapes to accommodate ratchet pawls having different dimensions of pawl end and rotating seat end.

* * * * *